(12) United States Patent
Ruane et al.

(10) Patent No.: US 11,271,731 B2
(45) Date of Patent: Mar. 8, 2022

(54) SINGLE-USE PASSWORD GENERATION

(71) Applicant: Micron Technology, Inc., Boise, ID (US)

(72) Inventors: James Ruane, San Jose, CA (US); Robert W. Strong, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 183 days.

(21) Appl. No.: 16/677,270

(22) Filed: Nov. 7, 2019

(65) Prior Publication Data

US 2021/0143992 A1  May 13, 2021

(51) Int. Cl.
*H04L 9/08* (2006.01)
*H04L 9/32* (2006.01)

(52) U.S. Cl.
CPC .......... *H04L 9/0863* (2013.01); *H04L 9/0825* (2013.01); *H04L 9/0869* (2013.01); *H04L 9/3226* (2013.01)

(58) Field of Classification Search
CPC ... H04L 9/0863; H04L 9/3226; H04L 9/0869; H04L 9/0825
See application file for complete search history.

(56) References Cited

U.S. PATENT DOCUMENTS

| | | | |
|---|---|---|---|
| 8,059,814 B1 | 11/2011 | Duane | |
| 9,043,604 B2 | 5/2015 | Brickell et al. | |
| 9,306,741 B1* | 4/2016 | Brainard | H04L 9/0861 |
| 10,313,333 B2 | 6/2019 | Ibrahim et al. | |
| 10,341,341 B2 | 7/2019 | Fairbanks et al. | |
| 2003/0084292 A1* | 5/2003 | Pierce | H04L 63/0823 713/168 |
| 2005/0235145 A1* | 10/2005 | Slick | H04L 63/0428 713/165 |
| 2015/0242657 A1* | 8/2015 | Kim | G06F 21/78 713/193 |
| 2016/0330195 A1 | 11/2016 | Paert | |
| 2016/0350238 A1* | 12/2016 | Ford | G06F 21/6218 |
| 2020/0092097 A1* | 3/2020 | Chiu | G06Q 20/3678 |
| 2021/0176053 A1* | 6/2021 | Santos | G06F 21/78 |

OTHER PUBLICATIONS

"International Application Serial No. PCT US2020 059508, International Search Report dated Feb. 24, 2021", 3 pgs.
"International Application Serial No. PCT US2020 059508, Written Opinion dated Feb. 24, 2021", 4 pgs.

(Continued)

*Primary Examiner* — Henry Tsang
(74) *Attorney, Agent, or Firm* — Schwegman Lundberg & Woessner, P.A.

(57) ABSTRACT

A request for password generation is received from a host system. In response to receiving the request, a password derivation key is generated based on a key derivation seed. A password is derived from the password derivation key, and a wrapping key is derived from the password. The wrapping key is used to wrap an authorization state indication, which is stored in local memory. Encrypted data is generated based on an encryption of the key derivation seed using an asymmetric encryption key. The encrypted data is provided in response to the request.

20 Claims, 12 Drawing Sheets

(56) References Cited

OTHER PUBLICATIONS

"Optimal asymmetric encryption padding", https: en.wikipedia.org wiki Optimal_asymmetric_encryption_padding, (Accessed on Mar. 3, 2021), 3 pgs.

Barker, Elaine, "Recommendation for Key Management:", Part 1—General SP 800-57 Part 1 Rev. 5, (May 2020), 3 pgs.

Chen, Lily, "Recommendation for Key Derivation Using Pseudorandom Functions", Computer Security Division Information Technology Laboratory, (Oct. 2009), 21 pgs.

\* cited by examiner

SINGLE-USE PASSWORD GENERATION

TECHNICAL FIELD

Embodiments of the disclosure relate generally to memory sub-systems, and more specifically, relate to single-use password generation for use in memory sub-systems.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
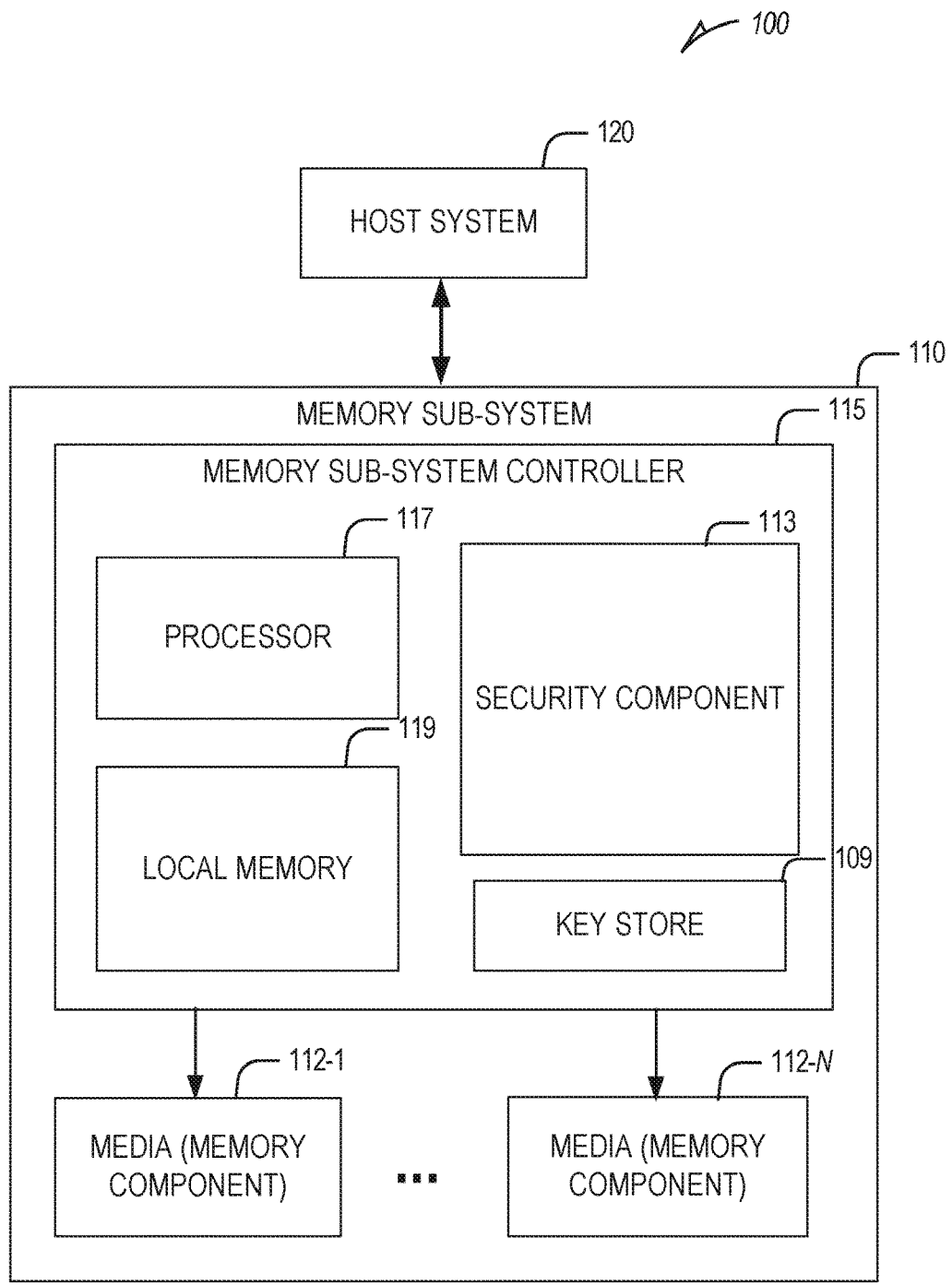
FIG. 1 illustrates an example computing environment that includes a memory sub-system, in accordance with some embodiments of the present disclosure.

Aspects of the present disclosure are directed to single-use password generation and authentication in a memory sub-system. A memory sub-system is also hereinafter referred to as a "memory device." An example of a memory sub-system is a storage system, such as a SSD. In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system. A memory sub-system controller typically receives commands or operations from the host system and converts the commands or operations into instructions or appropriate commands to achieve the desired access to the memory components of the memory sub-system.

A memory sub-system may store confidential, proprietary, or other sensitive information that should only be accessed by specifically authorized users such as field engineers. As an example of such information, a memory sub-system may maintain and store a debug log that includes information regarding operation of the memory sub-system that may be used to diagnose and correct problems occurring on the memory sub-system. In many instances, this type of sensitive information needs to be communicated to an external computing machine (e.g., server) operated by personnel who are authorized to access the information. With conventional memory sub-systems, both the retrieval of the information from the memory sub-system and communication of the information to the external computing machine are vulnerable to snooping because of a lack of security protocols. These security vulnerabilities of conventional memory sub-systems may result in unauthorized access of sensitive information included therein.

Public Key Infrastructure (PKI) is often used in these communications to cryptographically sign and verify sensitive information, and in this manner, trust of origin and the capability to detect unauthorized modification can be derived.

Example uses of PKI include firmware signing and verification as well as authorization of commands that may compromise security of a memory sub-system. In certain implementations, a public key of an asymmetric encryption key pair is maintained by a memory sub-system to perform verification processes while the private key is secured by a hardware security module (HSM) of a secure system that is external to and independent of the memory sub-system.

Rivest-Shamir-Adleman (RSA) PKI operations allow for encryption and decryption operations. Data encrypted by the public key can only be decrypted by the corresponding private key. If this private key is secured at the external secure system, the memory sub-system can encrypt sensitive information that may be exported from the memory sub-system and transported to the secure system through an unsecured channel for decryption at the secure system. To facilitate this communication of the encrypted sensitive information, a user, often a field application engineer (FAE), must access a proprietary network, either directly or through a virtual private network, to communicate with the secure system. However, in certain environments in which memory sub-systems are deployed, it is not possible to access an external network. The network access limitations of these environments present a difficult challenge in securely unlocking and interrogating memory sub-systems (e.g., for debug purpose).

Aspects of the present disclosure address the above and other deficiencies by implementing a secure mechanism for generating a single-use password at a memory sub-system. Although the password itself is not stored at the memory sub-system, information from which the password may be derived is securely transferred to a secure server for regeneration of the password. Once the password is regenerated from the information by the secure server, it is returned to a requesting user (e.g., a FAE) who may use it to unlock the memory sub-system or execute privileged commands.

Consistent with some embodiments, an asymmetric key pair comprising a public key and a private key is generated, and a memory sub-system controller is provisioned with the public key to encrypt sensitive information. A secure server is provisioned with the private key to decrypt the sensitive information. A host system may request generation of a password from the memory sub-system, and the memory sub-system responds with a password regeneration object that includes encrypted data comprising a key derivation seed from which a password may be derived. A security component of the memory sub-system uses the public key to generate the encrypted data. Since only the secure server has the private key, only the secure server may access the key derivation seed and derive the password therefrom. Accordingly, a user of the host system may forward the password object to the secure server as part of a password regeneration request, and the secure server, in turn, decrypts the encrypted data using the private key, and uses the key derivation seed to derive the password, which is returned in response to the request.

In some embodiments, the security component of the memory sub-system generates the key derivation seed using a random or pseudo-random number generator and derives a password derivation key from the key derivation seed using a key derivation function (KDF). The security component uses a password derivation function (PDF) to derive a password from the password derivation key. The security component uses a password-based key derivation function (PBKDF) to derive a wrapping key from the password to wrap an authorization/unlock state indication. The security component stores the wrapped authorization/unlock state indication, rather than the password itself, in local memory. The security component uses the public key to generate encrypted data that includes the key derivation seed and generates a password derivation object that includes the encrypted data. The password object is provided in response to the request.

Upon receiving the password object in response to the request, a user of the host system may submit a password regeneration request that includes the password object to the secure server. The secure server uses the corresponding private key to decrypt the encrypted data in the password object. The secure server uses the KDF to derive the password derivation key from the key derivation seed included in the decrypted data, and the secure server uses the PDF to derive the password from the password derivation key. The secure server provides the password in response to the password regeneration request. Upon receiving the password, the user may unlock the memory sub-system using the password. After being used to unlock the memory sub-system, the password may never be used again. Hence, the password may only be used once.

Utilizing the security protocol described above reduces vulnerabilities in the communication of sensitive information that is present in conventional memory sub-systems by preventing access of sensitive information by unauthorized parties. For example, at worst, only the encrypted data, rather than the raw data, may be accessed via snooping. Additionally, the security protocol provides a secure mechanism for authorized personnel to securely access sensitive information from a memory sub-system.

FIG. 1 illustrates an example computing environment 100 that includes a memory sub-system 110, in accordance with some embodiments of the present disclosure. The memory sub-system 110 can include media, such as memory components 112-1 to 112-N. The memory components 112-1 to 112-N can be volatile memory components, non-volatile memory components, or a combination of such. In some embodiments, the memory sub-system 110 is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, and the like. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS), and so forth. The physical host interface can be used to transmit data between the host system 120 and the memory sub-system 110. The host system 120 can further utilize an NVM Express (NVMe) interface to access the memory components 112-1 to 112-N when the memory sub-system 110 is coupled with the host system 120 by the PCIe interface. The physical host interface can provide an interface for passing control, address, data, and other signals between the memory sub-system 110 and the host system 120.

The memory components 112-1 to 112-N can include any combination of the different types of non-volatile memory components and/or volatile memory components. An example of non-volatile memory components includes a negative- and (NAND)-type flash memory. Each of the memory components 112-1 to 112-N can include one or more arrays of memory cells such as single-level cells (SLCs) or multi-level cells (MLCs) (e.g., triple-level cells (TLCs) or quad-level cells (QLCs)). In some embodiments, a particular memory component can include both an SLC portion and an MLC portion of memory cells. Each of the memory cells can store one or more bits of data (e.g., data blocks) used by the host system 120. Although non-volatile memory components such as NAND-type flash memory are described, the memory components 112-1 to 112-N can be based on any other type of memory such as a volatile memory. In some embodiments, the memory components 112-1 to 112-N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, as noted above, the memory cells of the memory components 112-1 to 112-N can be grouped as data blocks that can refer to a unit of the memory component used to store data.

A memory sub-system controller 115 (hereinafter referred to as a "controller") can communicate with the memory components 112-1 to 112-N to perform operations such as reading data, writing data, or erasing data at the memory components 112-1 to 112-N and other such operations. The controller 115 can include hardware such as one or more integrated circuits and/or discrete components, a buffer memory, or a combination thereof. The controller 115 can be a microcontroller, special-purpose logic circuitry (e.g., a field-programmable gate array (FPGA), an application-specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include ROM for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112-1 to 112-N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112-1 to 112-N. The controller 115 can further include host interface circuitry to communicate with the host system 120 via the physical host interface. The host interface circuitry can convert the commands received from the host system 120 into command instructions to access the memory components 112-1 to 112-N as well as convert responses associated with the memory components 112-1 to 112-N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112-1 to 112-N.

The memory sub-system 110 also includes a security component 113 that facilitates secure communication with the memory sub-system 110. The security component 113 may be included in the controller 115 or any one or more of the memory components 112-1 to 112-N. In some embodiments, the controller 115 includes at least a portion of the security component 113. For example, the controller 115 can include the processor 117 (processing device) configured to execute instructions stored in the local memory 119 for performing the operations described herein. In some embodiments, the security component 113 is part of the host system 120, an application, or an operating system.

The security component 113 is responsible for generating password objects and authorizing access to data stored by the memory sub-system 110 based on passwords derived therefrom. More specifically, the security component 113 generates password objects from which single-use passwords may be derived. Each single-use password may be used only once to unlock the memory sub-system 110. The passwords themselves are not stored by the security component 113 or any other component of the memory sub-system 110. Rather, the security component 113 generates and stores data to which a password may be compared to verify that the correct password is being used. After a password is used to unlock the memory sub-system 110, the underlying data used to verify the password is discarded.

The security component 113 receives requests for password generation from the host system 120 and provides the host system 120 with a password object in response thereto. The password object includes encrypted data comprising a key derivation seed from which a password derivation key may be derived and used to derive a password. The security component 113 may further include a key store 109 to store one or more encryption keys used by the security component 113 to encrypt information. In some embodiments, the key store 109 is implemented within a local memory of the memory sub-system controller 115 (e.g., the local memory 119). In some embodiments, the key store 109 is implemented within one or more of the memory components 112-1 to 112-N.

The security component 113 also receives authentication requests for accessing the memory sub-system 110. Each authentication request includes a password, which may be provided to a user of the host system 120 (e.g., a field engineer) by a secure server that is responsible for deriving the password from a password object generated by the security component 113. The security component 113 compares the password to stored information to determine whether the password is correct, and if so, the security component 113 provides an unlock/authorization indication, unlocks the memory sub-system 110, and discards the stored information used to determine whether the password is correct.

The security component 113 may communicate with the host system 120 via the physical host interface or a native sideband communication port (e.g., a Universal Asynchronous Receiver/Transmitter (UART) port or other serial communication port that supports two-way communication) that may be specially configured as a diagnostic or maintenance port.

Figure 2:
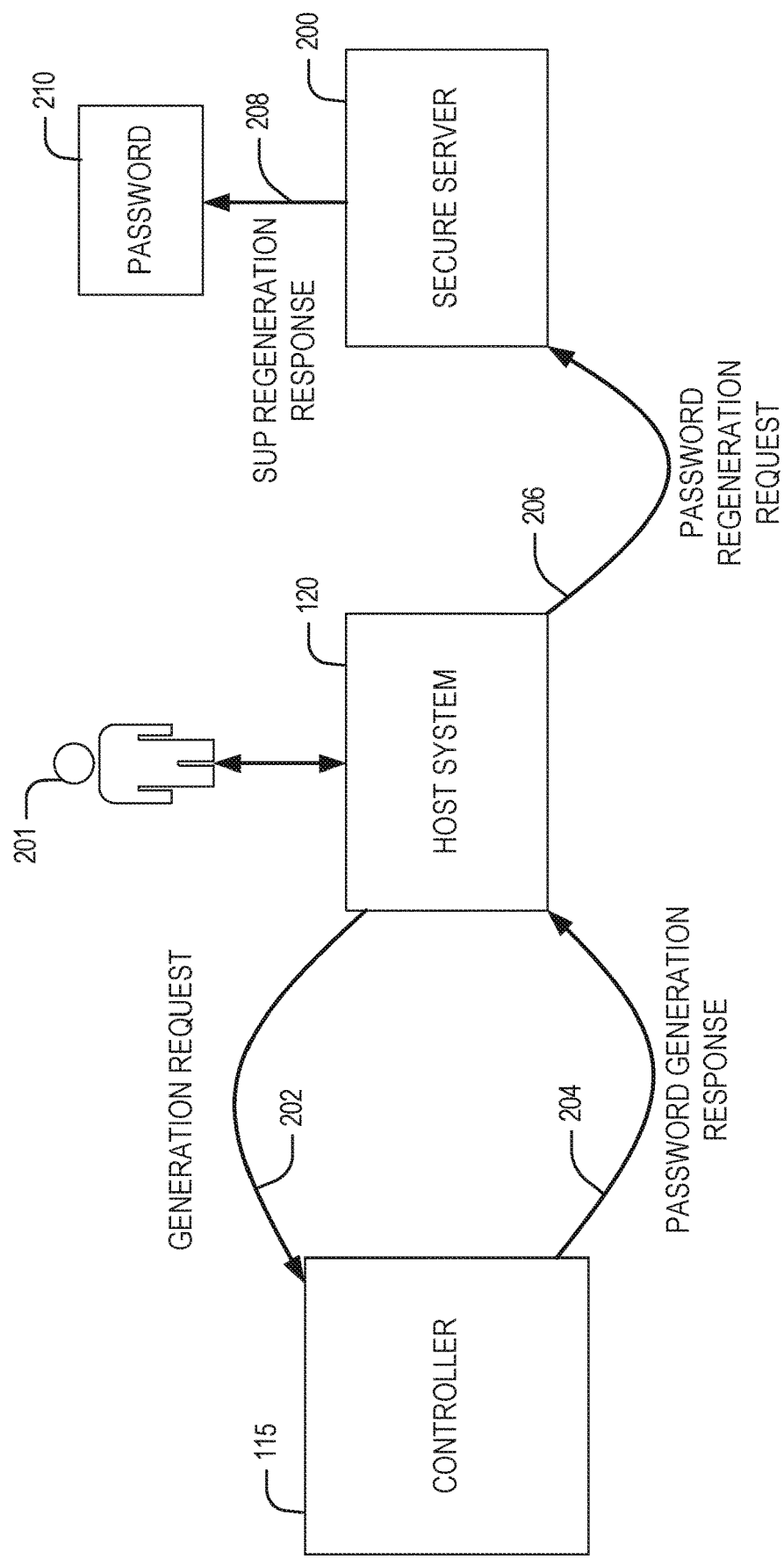
FIG. 2 is a data flow diagram illustrating interactions between components in a secure communication environment in performing an example method for generation and use of a single-use password, in accordance with some embodiments of the present disclosure.

FIG. 2 is a data flow diagram illustrating interactions between components in a secure communication environment in performing an example method for generation and use of a single-use password, in accordance with some embodiments of the present disclosure. In the context of FIG. 2, an asymmetric encryption key pair—a public key and a private key—may be pre-generated, and the security component 113 may be provisioned with the public key to encrypt data, while a secure server 200 is provisioned with the private key to decrypt the data.

As shown, at 202, the host system 120 sends a request for password generation. In response to the request, the security component 113 of the controller 115 generates a password object. The password object does not itself include a password nor does the security component 113 store the password itself. Instead, the password object comprises encrypted data generated using the public key, and the encrypted data comprises a key derivation seed from which a password derivation key may be derived and used to derive a password.

At 204, the controller 115 responds to the request from the host system 120 with the password object, and at 206 a user 201 of the host system 120 (e.g., a FAE) in turn provides the password object as part of a password regeneration request to the secure server 200 capable of decrypting the encrypted data. The secure server 200, in turn, decrypts the encrypted data and derives the password derivation key from the key derivation seed. The secure server 200 then derives a password 210 from the password derivation key, and at 208, the secure server 200 provides the password 210 (e.g., back to the host system 120 or the user 201 of the host system 120) in response to the password regeneration request.

As will be discussed further below, the user 201 of the host system 120 may use the password a single time to unlock the memory sub-system 110. As noted above, the security component 113 does not store the password itself. Instead, the security component 113 also derives a wrapping key from the password and uses the wrapping key to wrap an authorization indication. The wrapped authorization indication is stored by the security component 113 (e.g., in the local memory 119) and may be unwrapped with an unwrapping key derived from the password upon the security component 113 receiving the password in an authentication request. Assuming that the password initially derived by the security component 113 matches the password provided in the authentication request, the unwrapping key will be identical to the wrapping key, and thus capable of unwrapping the wrapped authorization indication. Upon the security component 113 successfully unwrapping the wrapped authorization indication, the authorization indication is provided and the memory sub-system 110 enters an unlocked state. After the password is used to unlock the memory sub-system 110, the wrapped data corresponding to the password is discarded.

Figure 3A:
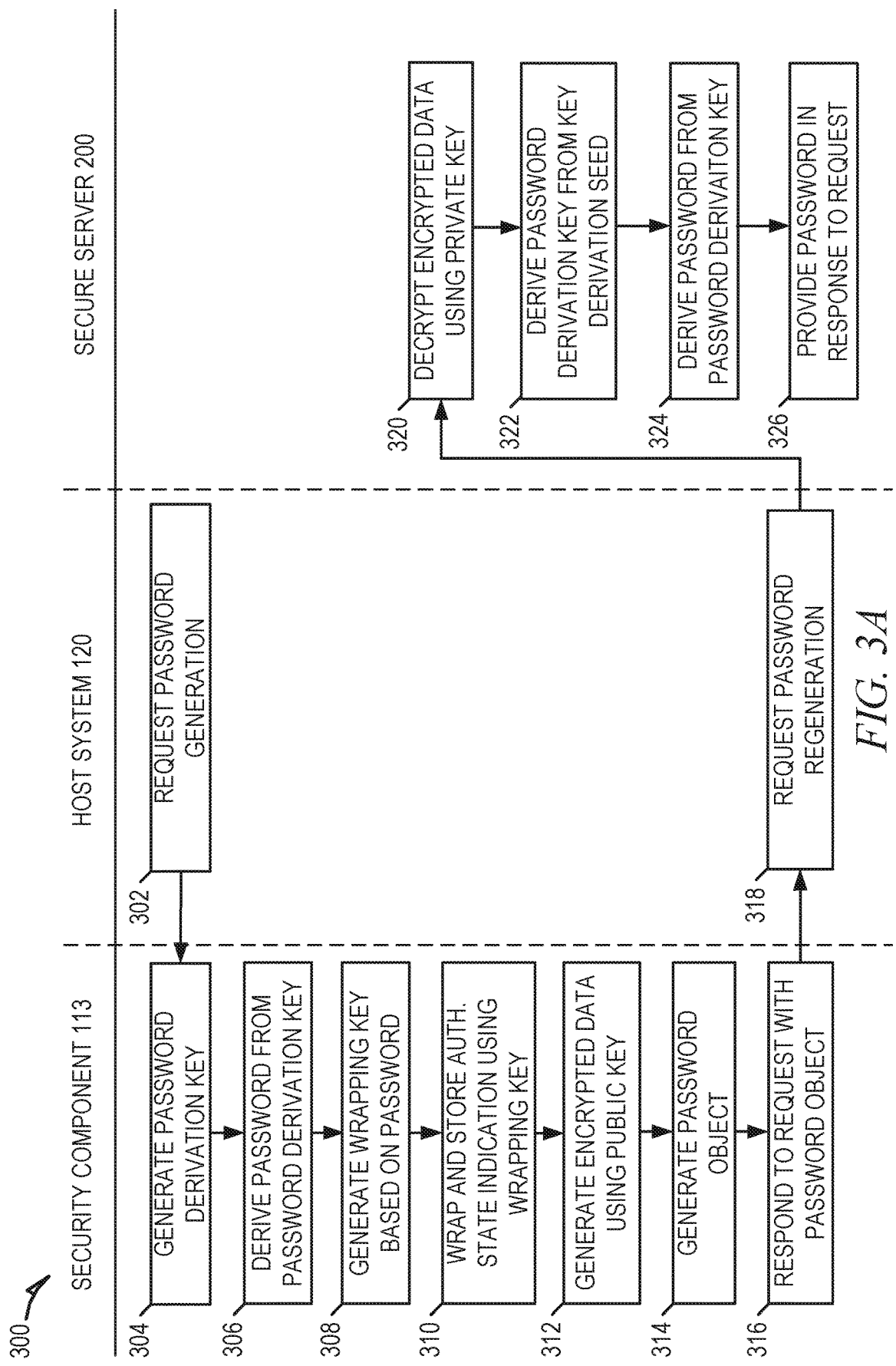
FIGS. 3A and 3B are swim lane diagrams illustrating interactions between components in the secure communication environment in performing an example method for single-use password generation and authentication, in accordance with some embodiments of the present disclosure.
Figure 3B:
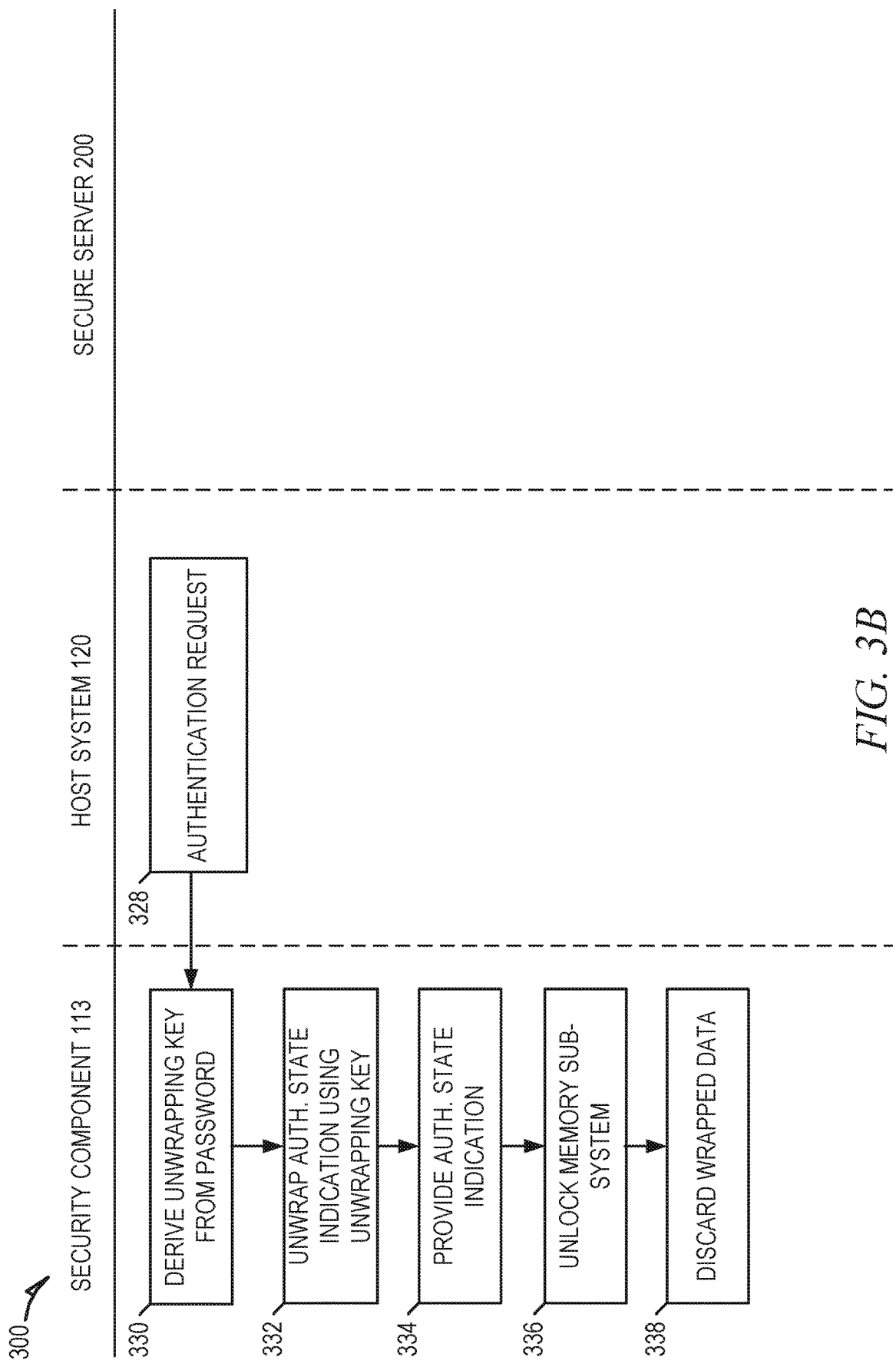

FIGS. 3A and 3B are swim lane diagrams illustrating interactions between components in the secure communication environment in performing an example method 300 for single-use password generation and authentication, in accordance with some embodiments. As shown in FIG. 3A, the method 300 begins at operation 302 where the host system 120 sends a request for password generation to the security component 113 of the controller 115. In response to receiving the request, the security component 113 generates, at operation 304, a password derivation key using a key derivation function (KDF) (e.g., a hash-based message authentication code (HMAC) derivation). The KDF derives the password derivation key from a key derivation seed using a deterministic random bit generator (DRBG) function. The key derivation seed comprises a random or pseudo-random value generated using a random or pseudo-random number generator.

At operation 306, the security component 113 derives a password from the password derivation key using a password derivation function (PDF) The security component 113 generates a wrapping key based on the password using a password-based key derivation function (PBKDF) (e.g., PBKDF1 or PBKDF2), at operation 308. The security component 113, at operation 310, uses the wrapping key to wrap an authorization state indication, which is stored in a local memory (e.g., internal SRAM) of the controller 115. The security component 113 may use one of many known wrapping mechanisms to wrap the authorization state indication using the wrapping key. The stored wrapped data is discarded after a successful authentication and does not survive a reboot or reset of the memory sub-system 110.

At operation 312, the security component 113 generates encrypted data using a public key (e.g., an asymmetric encryption key generated as part of a key pair using an RSA algorithm and stored in the key store 109). The encrypted data includes the key derivation seed among other data, which is discussed further below. At operation 314, the security component 113 generates a password object based on the encrypted data. The security component 113 may generate the password object by concatenating the encrypted data with an object header. At operation 316, the security component 113 responds to the request from the host system 120 with the password object. Prior to providing the password object to the host system 120, the security component 113 may encode the password object or a portion thereof using a binary-to-text encoding scheme such as BASE64, for example.

The host system 120 is not provisioned with a corresponding private key, and thus, the host system 120 is unable to decrypt the encrypted data in the password object. Accordingly, upon receiving the password object, the host system 120 or a user of the host system 120 (e.g., a FAE) sends the password object to the secure server 200 as part of a password regeneration request, at operation 318.

The secure server 200 maintains the private key corresponding to the public key used to generate the encrypted data included in the password object. Thus, the secure server 200 is capable of decrypting the encrypted data. Accordingly, upon receiving the password object, the secure server 200 decrypts the encrypted data, at operation 320, using the private key. The public key may be included in the password object and used as a handle to identify the appropriate private key representation. In embodiments in which the password object or a portion thereof is encoded, the secure server 200 may decode the password object or the portion prior to decryption using the private key.

Upon decrypting the encryption data, the secure server 200 uses the KDF to derive the password derivation key from the key derivation seed, at operation 322. At operation 324, the secure server 200 uses the PDF to derive the password from the password derivation key. At operation 326, the secure server 200 provides the password to the host system 120 in response to the password regeneration request. A FAE or other personnel may then use the password to unlock the memory sub-system 110.

For example, as shown in FIG. 3B, at operation 328, the host system 120 provides an authentication request to the security component 113. The authentication request includes the password supplied to the host system 120 at operation 326. Upon receiving the password, the security component 113 uses the PBKDF to derive an unwrapping key from the password, at operation 330. Assuming that the password is correct, the unwrapping key is identical to the wrapping key used to wrap the authorization state indication (at operation 310). At operation 332, the security component 113 unwraps the wrapped authorization state indication stored in local memory using the unwrapping key. At operation 334, the security component 113 provides the authorization state indication based on a successful unwrapping of the authorization state indication, and at operation 336, the security component 113 unlocks the memory sub-system 110. At operation 338, the security component 113 discards the wrapped data based on use of the password. In this way, the password cannot be used again to unlock the memory sub-system 110.

Figure 4:
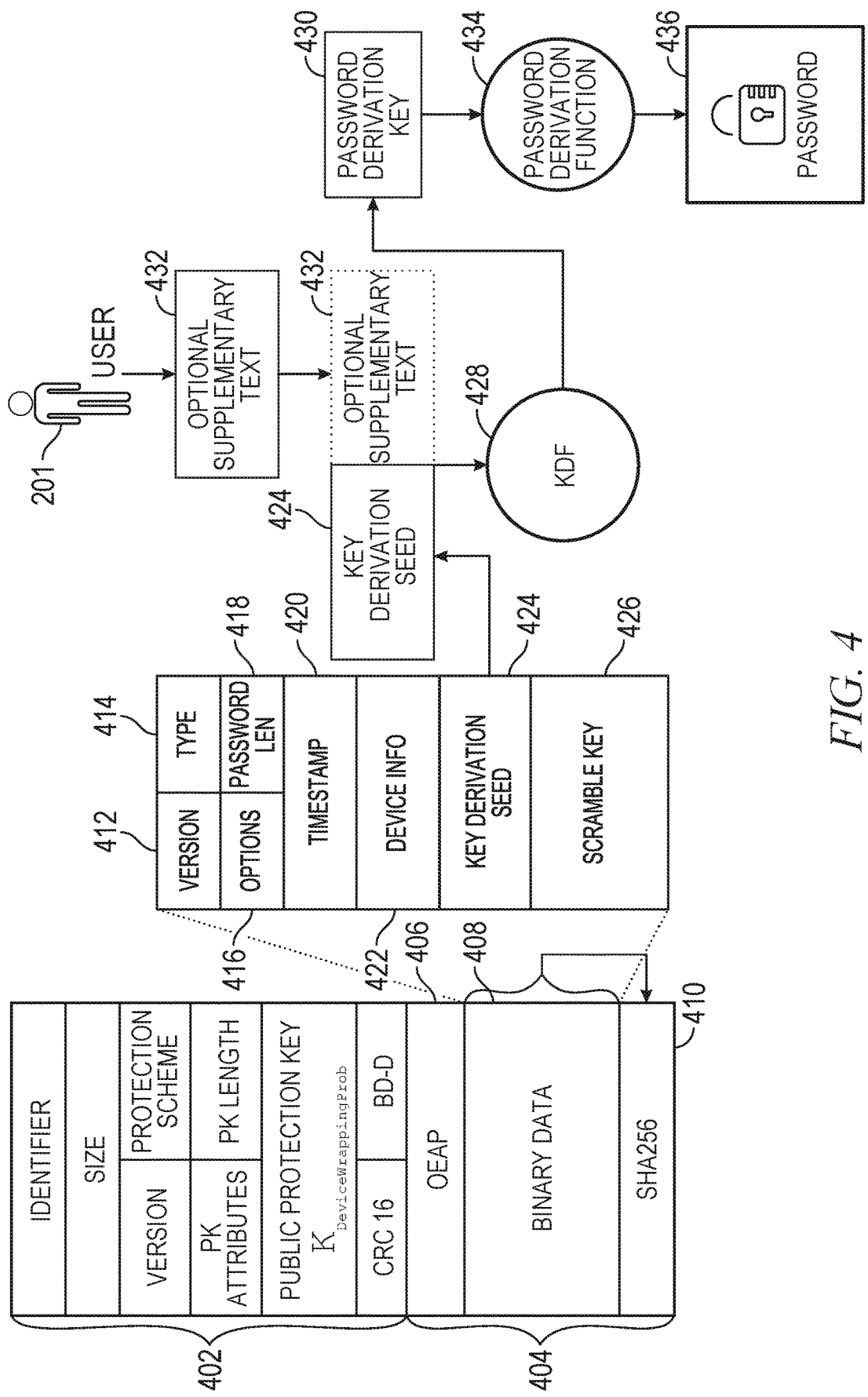
FIG. 4 is a block diagram illustrating components of a password object that is generated in accordance with some embodiments of the present disclosure.

FIG. 4 is a block diagram illustrating components of a password object 400 that is generated in accordance with some embodiments of the present disclosure. As shown, the password object 400 comprises an object header 402 and encrypted data 404. The object header 402 includes multiple fields comprising information about the password object 400 such as an identifier, a size, a version, a protection scheme, password key attributes, a password key length, and a public key.

The encrypted data 404 includes optimal asymmetric encryption padding (OAEP) 406, binary data 408, and a hash 410 of the binary data 408. The hash 410 is generated by providing the binary data 408 as input to a cryptographic hash function such as the Secure Hash Algorithm 256 (SHA256).

The binary data 408 includes multiple fields such as a version 412, a wrap type 414, options 416, a password length 418, a timestamp 420, device information 422, a key derivation seed 424, and a scramble key 426. The version 412, wrap type 414, options 416, password length 418, timestamp 420, and device information 422 fields may be collectively referred to herein as "non-random fields," as the fields are filled with non-random values. Conversely, the key derivation seed 424 and the scramble key 426 may be collectively referred to as "random fields," as these fields are filled with random values.

The version 412 field is used to specify the version of password object structure being used. The version 412 field may be used to determine compatibility between the object producer and the consumer. The wrap type 414 field is used to specify a wrapped object type and is used to distinguish between different wrapped objects.

The options 416 field is used to specify optional configuration information in the password object 400 and may implicitly define requirements for processing. For example, the options 416 field may be used to indicate that the timestamp 420 field is set, which may be used to implement an expiration time limit on the password object 400. As another example, the options 416 field may be used to indicate that additional optional seed data is to be used as part of the password derivation key derivation process. As yet another example, the options 416 field may be used to indicate that the KDF is a single HMAC derivation.

The password length 418 field is used to specify the length of the password being used (e.g., in bytes). The length may be configured per program or may be a range determined at random by the memory sub-system 110. The timestamp 420 field contains information regarding when the password object 400 was created. The device information 422 field contains device-specific information that can be used to identify which memory sub-system 110 created the password object 400.

The key derivation seed 424 is used to derive a password derivation key. The key derivation seed 424 is generated by the memory sub-system 110 using a DRBG function. The scramble key 426 may be used to obfuscate values in the non-random fields as well as the key derivation seed 424 to further protect against known answer attacks on data. The security component 113 also generates the scramble key 426 using the DRBG function used to generate the key derivation seed 424.

As shown in FIG. 4, the key derivation seed 424 is provided as input to a KDF 428 to produce a password derivation key 430. As illustrated in FIG. 4, in some embodiments, optional supplemental text 432 (e.g., supplied by the user 201) may be provided along with the key derivation seed 424 as input to the KDF 428 to produce the password derivation key 430. The security component 113 uses a PDF 434 to derive a password 436 from the password derivation key 430.

Figure 5:
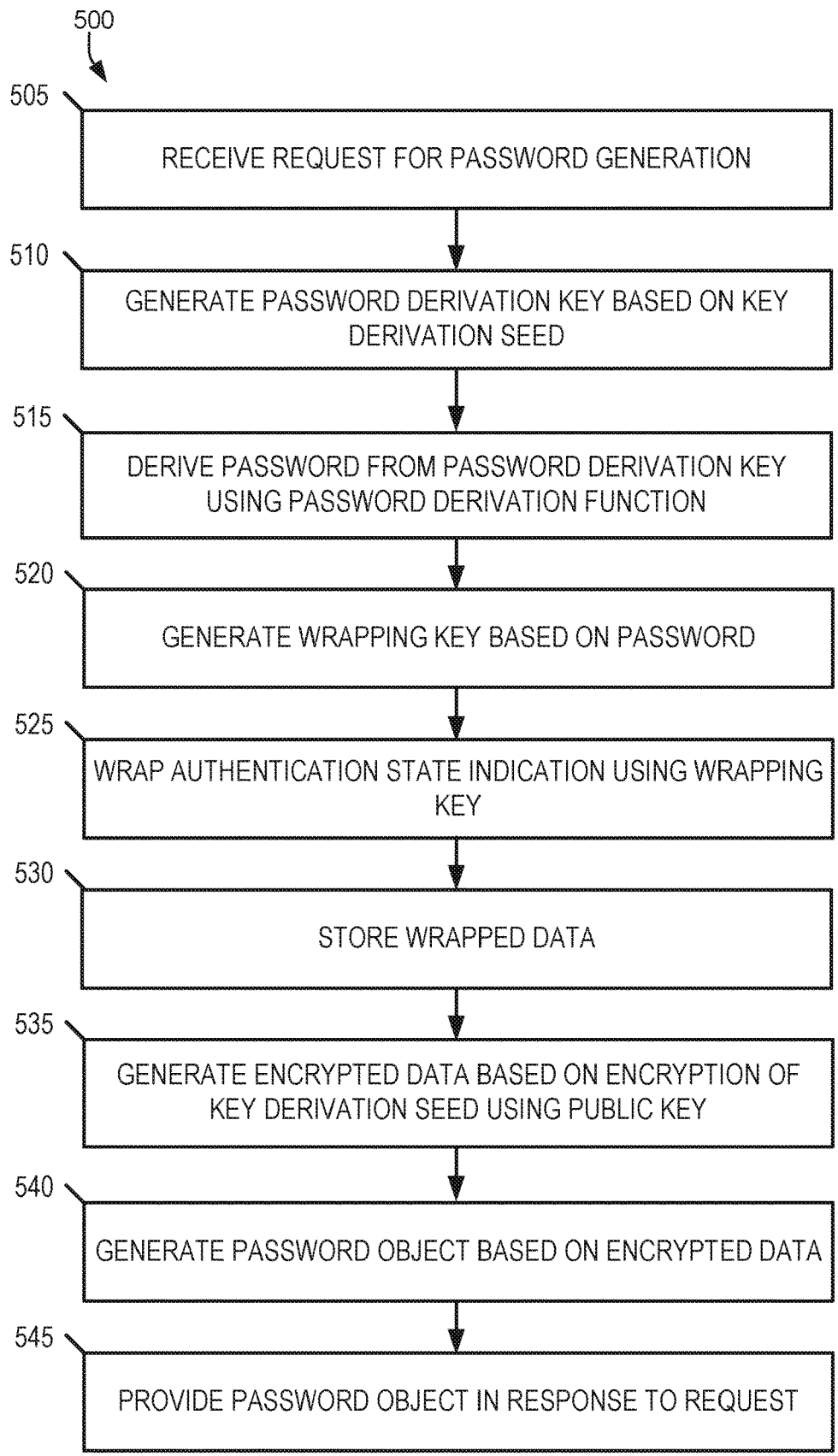
FIGS. 5-7 are flow diagrams illustrating an example method for single-use password generation and authentication in a memory sub-system, in accordance with some embodiments of the present disclosure.
Figure 6:
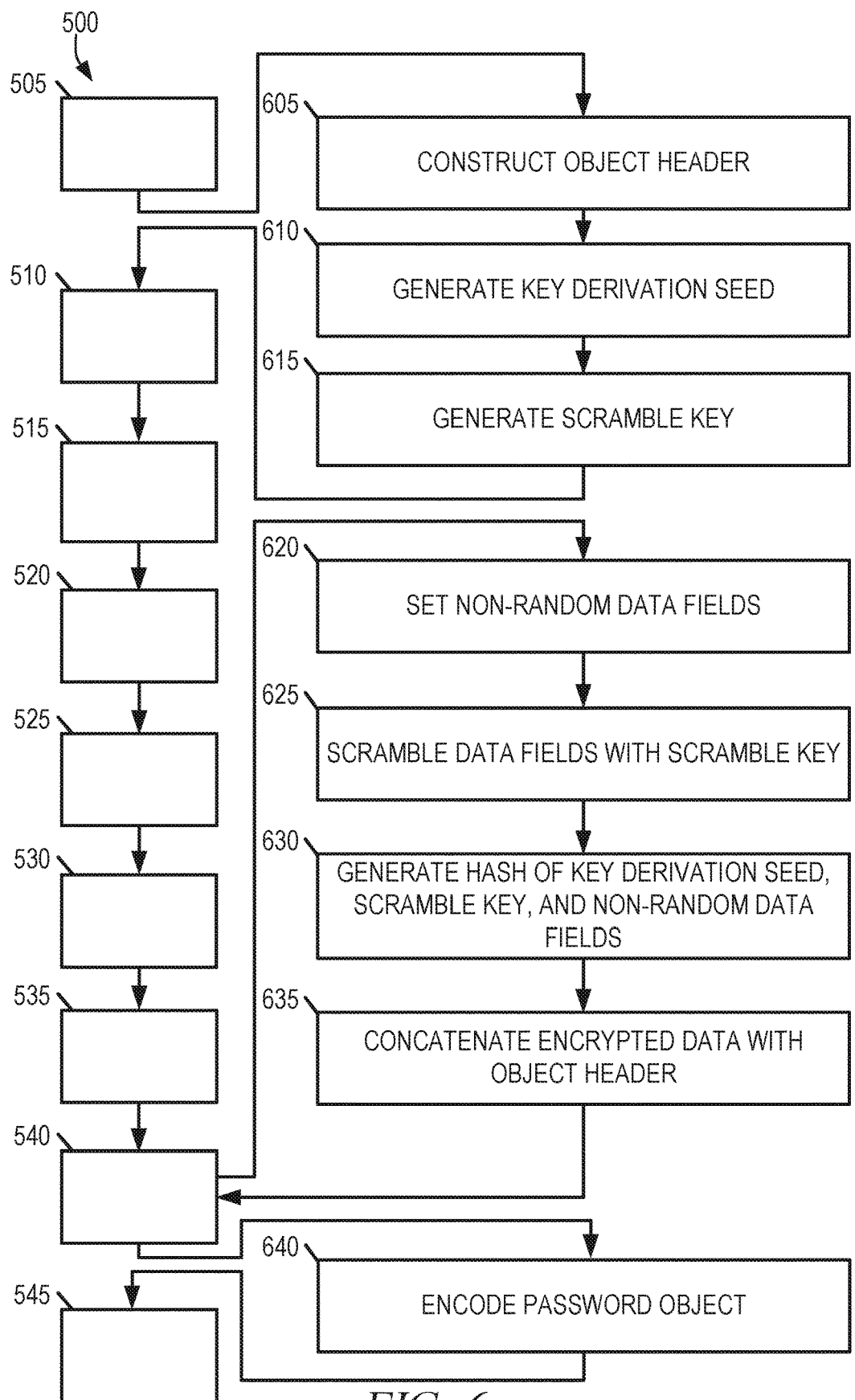
Figure 7:
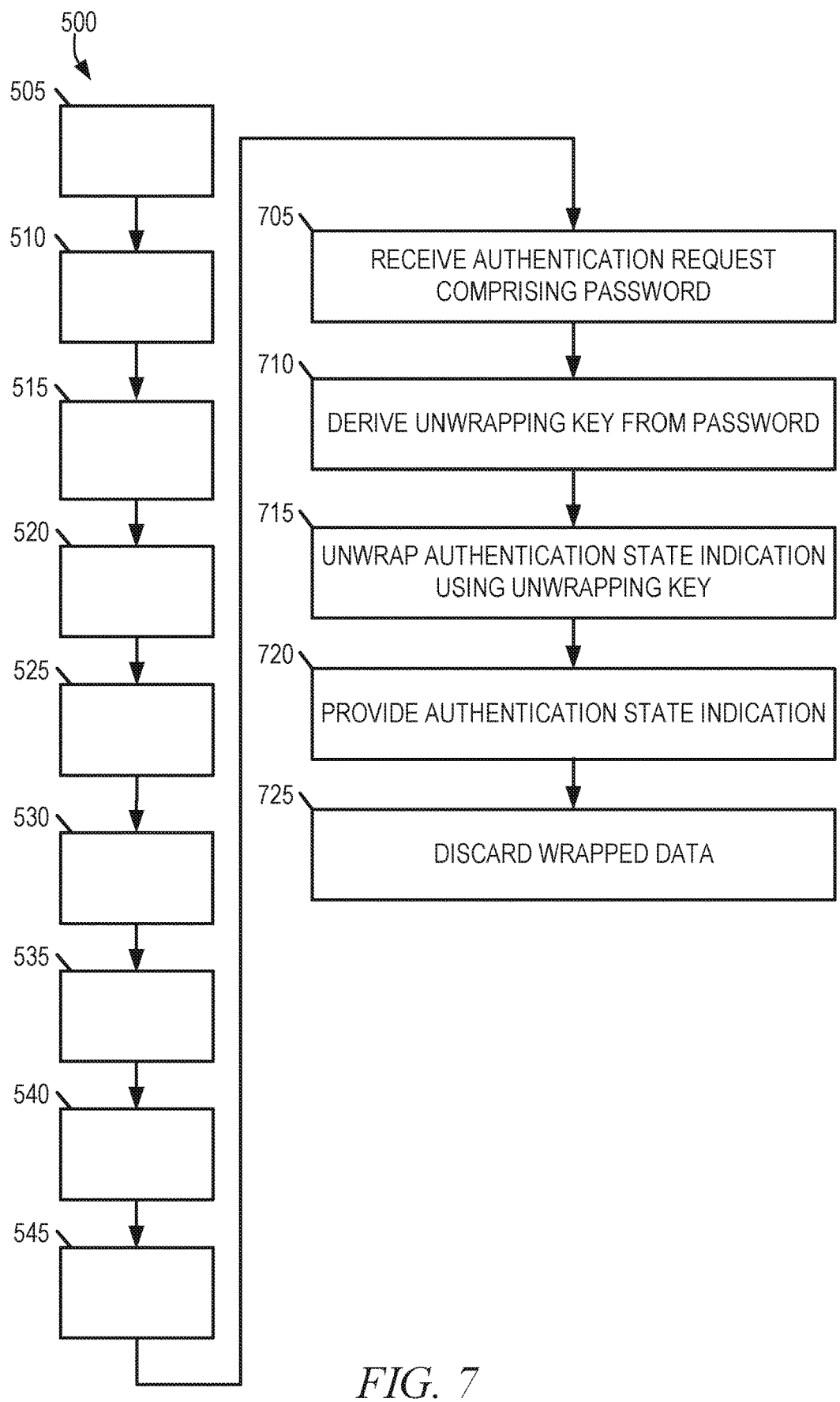

FIGS. 5-7 are flow diagrams illustrating an example method 500 for single-use password generation and authentication in a memory sub-system, in accordance with some embodiments of the present disclosure. The method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 500 is performed by the security component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device receives a request for password generation. The request may be received from the host system 120. In some embodiments, receiving the request includes receiving one or more commands from the host system via a host system interface. In some embodiments, receiving the request includes receiving the request from the host system via a communication port (e.g., a UART port or other serial communication port that supports two-way communication). The communication port, may be a native port specifically configured for diagnostic or maintenance purposes.

At operation 510, the processing device generates a password derivation key based on a key derivation seed. The processing device uses a KDF to derive the password derivation key from at least the key derivation seed. For example, the processing device may utilize a HMAC derivation function to derive the password derivation key. The key derivation seed is a random or pseudo-random value generated by the processing device using, for example, a DRBG function. Consistent with some embodiments, the output of the KDF is a 256-bit symmetric key, which corresponds to the password derivation key. It shall be noted that the password derivation key is not stored by the memory sub-system 110. The password derivation key is only derived by the memory sub-system 110 or the secure server 200 from the key derivation seed.

In some embodiments, optional supplemental data provided by the host system 120 may be incorporated into the password derivation key derivation process by appending it to the key derivation seed. The optional supplemental data provided by the host system 120 may, for example, comprise text generated by a user. Consistent with these embodiments, the processing device may use the KDF to derive the password derivation key from the combination of the key derivation seed and the supplemental data.

At operation 515, the processing device derives a password from the password derivation key. For example, the processing device may utilize the PDF in deriving the password from the password derivation key. Similar to the password derivation key, the derived password is not itself stored by the memory sub-system 110.

The processing device generates a wrapping key based on the password using a PBKDF (e.g., PBKDF1 or PBKDF2) as shown in operation 520. For example, the processing device may provide the password to the PBKDF and the output of the PBKDF may be the wrapping key. At operation 525, the processing device wraps an authorization state indication using the wrapping key. The processing device may utilize one of many known wrapping techniques to wrap the authorization state indication (e.g. based on the AES key wrap specification or American Standards Committee ANSX9.102 specification). The authorization state indication may be provided by the security component 113 upon receiving the password in an authentication request. The exact definition and use of the authorization state indication may be program-specific and may depend on capabilities of the memory sub-system 110. The authorization state indication comprises information on the interface that was used to submit the password generation request at operation 505 (e.g., UART, host interface, or port, number for multi-port enabled systems). In some embodiments, the authorization state indication may be used to enforce a strict password generation and authorization interface coherency, in implementations where authorization capability is allowed on the same interface.

As shown at operation 530, the processing device stores the wrapped authorization state indication in a local memory (e.g., the local memory 119). For example, the processing device may store the wrapped authorization state indication in SRAM.

Thereafter, the processing device generates encrypted data based on an encryption of the key derivation seed using an asymmetric encryption key (see operation 535). The generating of the encrypted data comprises encrypting binary data (e.g., the binary data 408) and a hash of the binary data (e.g., the hash 410), where the binary data includes the key derivation seed among other information. The asymmetric encryption key is a public key generated as part of a key pair using the RSA algorithm and provisioned to the processing device. Accordingly, the processing device may encrypt the binary data and the hash of the binary data using RSA encryption.

At operation 540, the processing device generates a password object (e.g., the password object 400) based on the encrypted data. The generating of the password object may comprise concatenating the encrypted data with an object header. Further details regarding an example password object are addressed above in reference to FIG. 4.

The processing device provides the password object in response to the request, at operation 545. For example, the processing device may return the password object to the host system 120 in response to a request received from the host system 120.

As shown in FIG. 6, the method 500 may, in some embodiments, include any one or more of operations 605, 610, 615, 620, 625, 630, 635, and 640. Consistent with these embodiments, the operations 605, 610, and 615 may be performed subsequent to operation 505 where the processing device receives the request for password generation.

As shown, at operation 605, the processing device constructs an object header (e.g., the object header 402) for the password object. The object header includes multiple fields comprising information about the password object such as an identifier, a size, a version, a protection scheme, password key attributes, a password key length, and the public asymmetric encryption key used to generate the encrypted data.

The processing device generates the key derivation seed (see operation 610). The key derivation seed is a random or pseudo-random value generated by the processing device using a DRBG function.

As shown at operation 615, the processing device generates a scramble key. The scramble key is also a random or pseudo-random value generated by the processing device using the DRBG function.

Consistent with these embodiments, the operations 620, 625, 630, and 635 may be performed as part (e.g., sub-operations) of 540, where the processing device generates the password object. At operation 620, the processing devices sets values in one or more non-random data fields of the password object. As noted above, the non-random data fields may include a version field (e.g., 412), a wrap type field 414), an options field (e.g., 416), a password length field (e.g., 418), a timestamp field (e.g., 420), and a device information field (e.g., 422).

The processing device, at operation 625, scrambles one or more data fields of the password object using the scramble key. For example, the processing device may scramble the non-random values in the non-random fields and/or the key derivation seed to protect against known answer attacks on the data. The processing device may scramble the data using exclusive OR (XOR) logic with the scramble key and data as input.

The processing device generates a hash of the key derivation seed, the scramble key, and the values of the non-random data fields (see operation 630). The processing device uses a cryptographic hash function to generate the hash. For example, the processing device may use SHA-256 to generate the hash. At operation 635, the processing device concatenates the encrypted data with the object header. In some embodiments, the operation 625 may be omitted. That is, the non-random data fields may not be scrambled prior to generating the hash. Consistent with these embodiments, the processing device generates a hash of the key derivation seed and unscrambled values for the non-random fields.

Consistent with these embodiments, operation 640 may be performed subsequent to operation 540, where the processing device generates the password object. At operation 640, the processing device encodes the password object using a binary-to-text encoding scheme (e.g., BASE64). The encoded format is intended to facilitate retrieval of the binary data over multiple interfaces (e.g., UART). The encoding may be implementation- and/or program-specific based on the type of transport required. In essence, the encoding of the password object converts the password object to a format suitable for export from the memory sub-system 110 for external processing and suitable for transport over a variety of mechanisms including email. In some embodiments, the encoded data may be bracketed with a descriptive notation indicating the start and end of the encoded data.

As shown in FIG. 7, the method 500 may, in some embodiments, include operations 705, 710, 715, 720, and 725. Consistent with these embodiments, the operations 705, 710, 715, 720, and 725 may be performed subsequent to operation 545 where the processing device provides the password object in response to the password generation request. More specifically, the operations 705, 710, 715, 720, and 725 may be performed subsequent to a user submitting the password object provided to the host system 120 at operation 545 to a secure server (e.g., the secure server 200) as part of a password regeneration request, and receiving a response from the secure server that includes the password.

As shown at operation 705, the processing device receives an authentication request comprising the password. The request may be received from the host system 120. In some embodiments, receiving the request includes receiving one or more commands from the host system via a host system interface. In some embodiments, receiving the request includes receiving the request from the host system via a communication port (e.g., a UART port or other serial communication port that supports two-way communication). As noted above, the password may be received by a user of the host system 120 from a secure server in response to a password regeneration request.

The processing device derives an unwrapping key from the password using the PBKDF (see operation 710). Assuming that the password supplied as part of the authentication request is the same password derived at operation 515, the unwrapping key will be identical to the wrapping key used to wrap the authorization state indication. Otherwise, the authentication request fails.

At operation 715, the processing device unwraps the authorization state indication using the unwrapping key. At operation 720, the processing device provides an authorization state indication based on the unwrapping of the authorization state indication.

The processing device, at operation 725, discards the wrapped data based on successful unwrapping. In this way, the password may not be used again to unlock the memory sub-system 110.

Figure 8A:
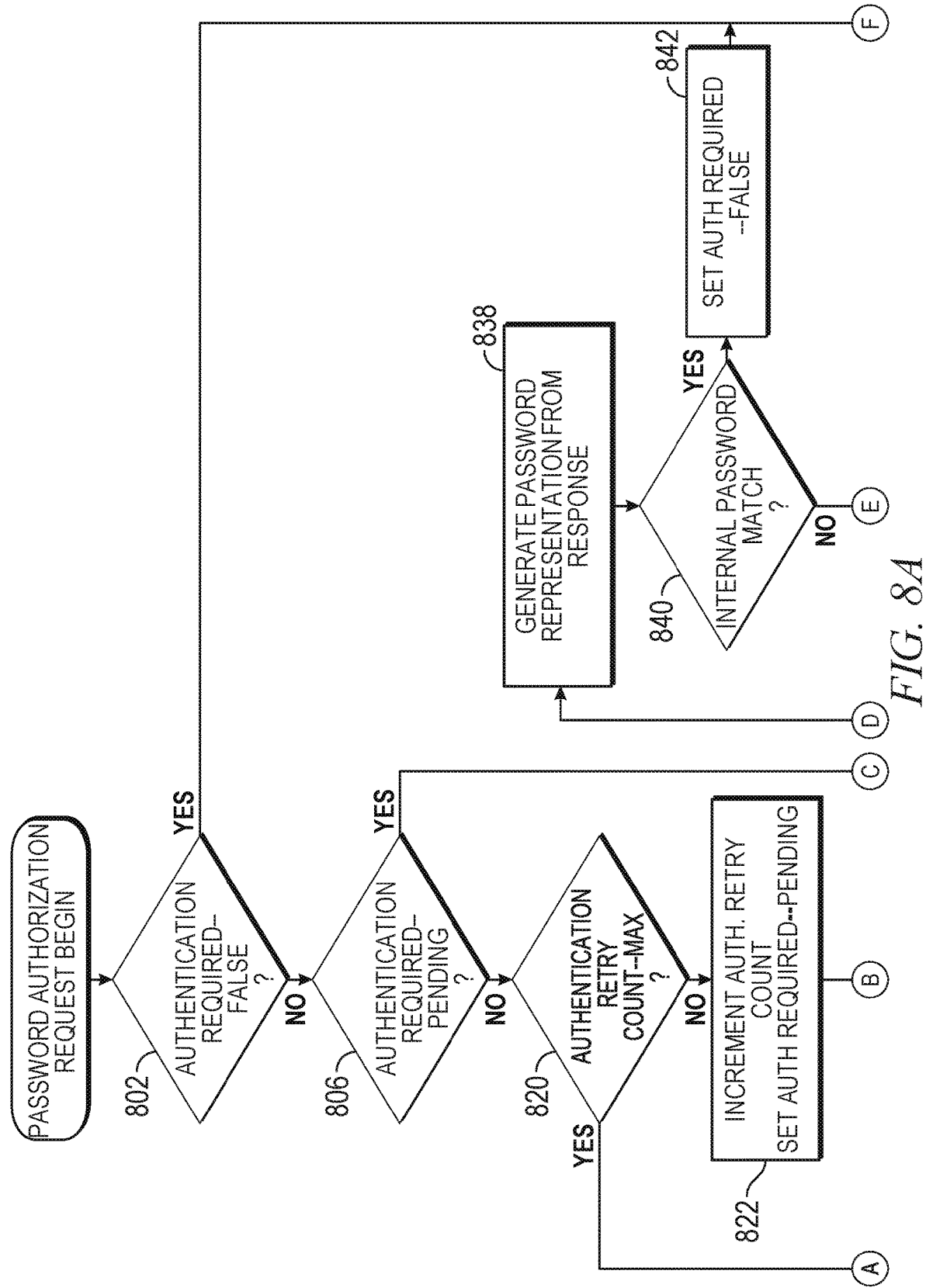
FIGS. 8A-8C are flow diagrams illustrating an example authentication session process, in accordance with some embodiments of the present disclosure.
Figure 8B:
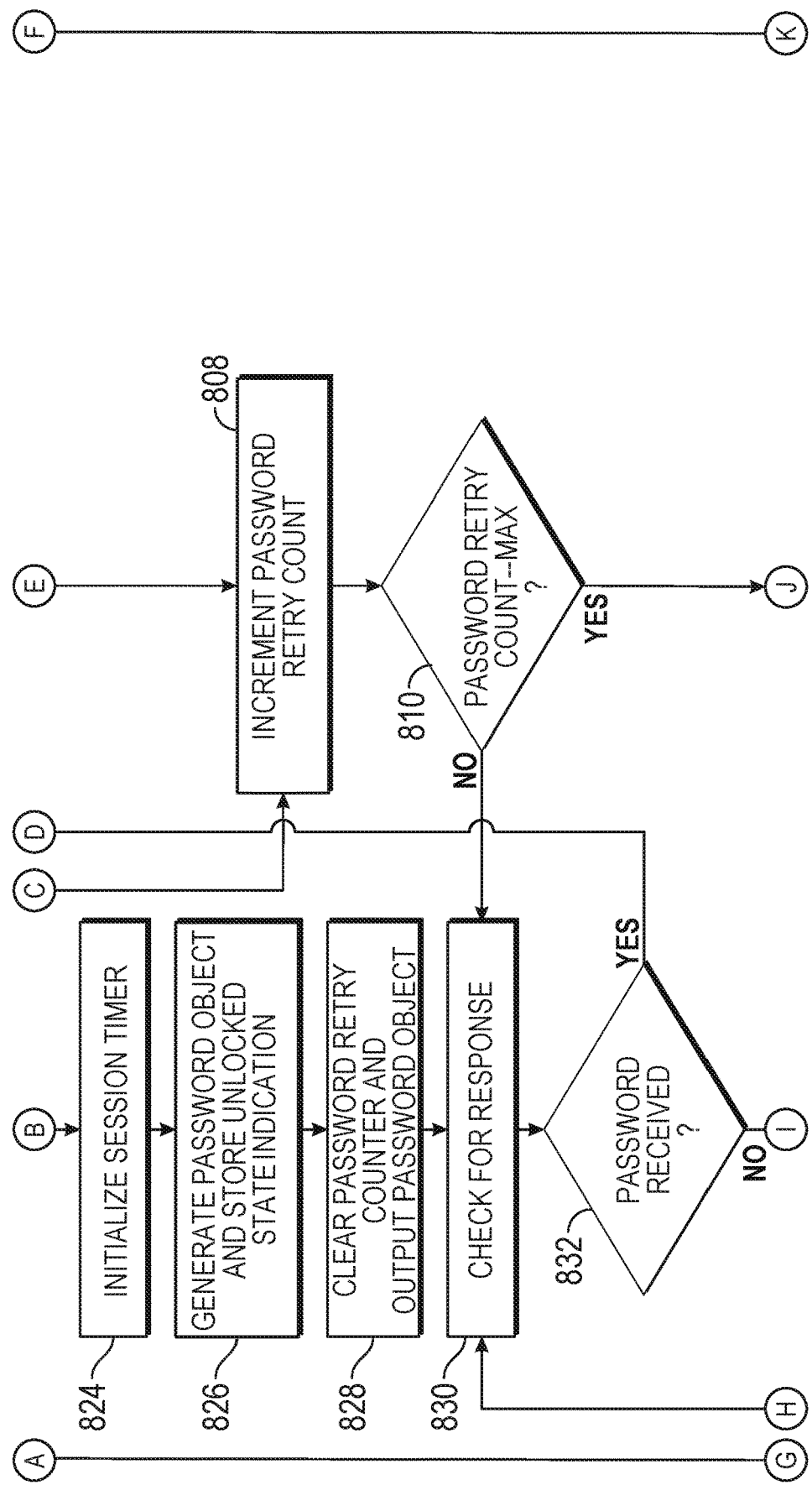
Figure 8C:
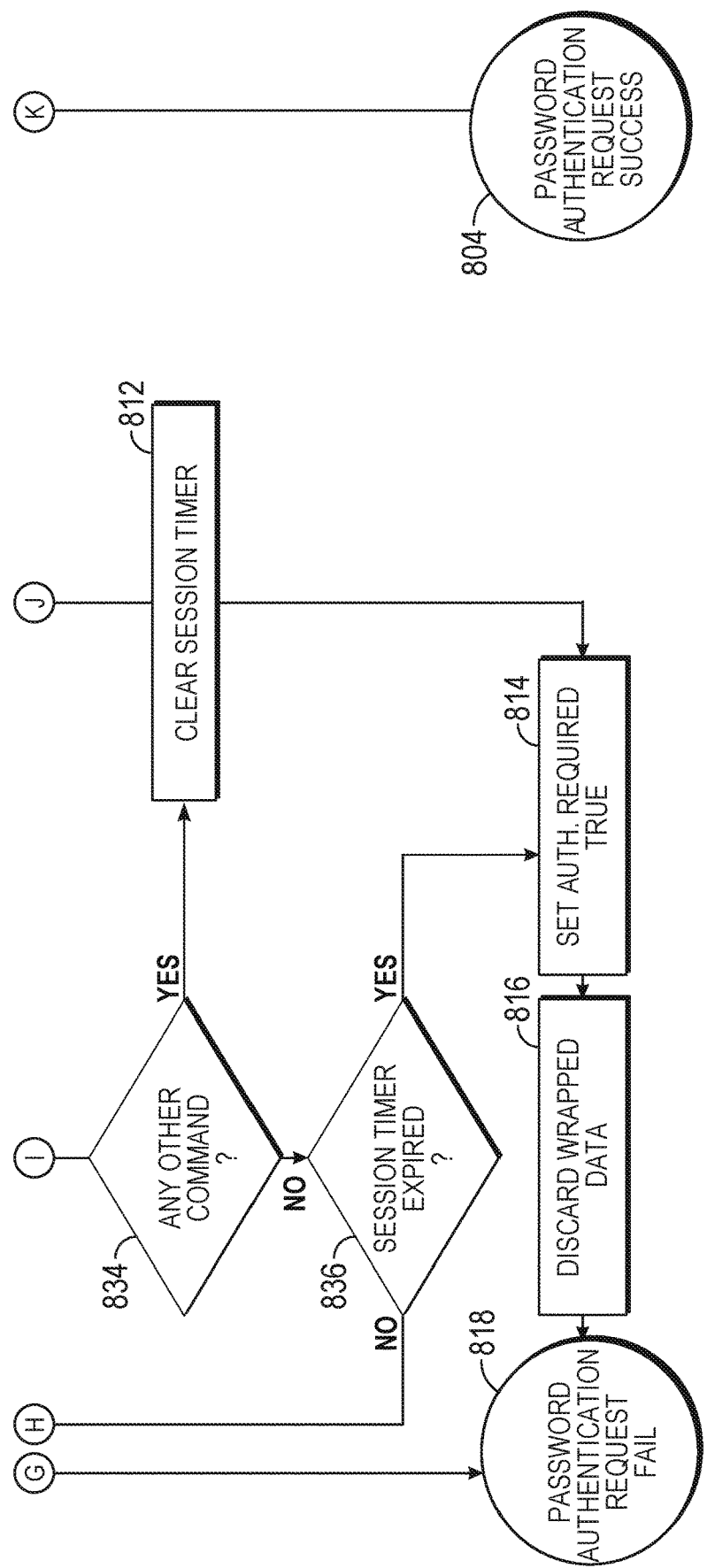

FIGS. 8A-8C are flow diagrams illustrating an example authentication session process 800, in accordance with some embodiments of the present disclosure. The process 800 can be performed by processing logic that can include hardware a processing device, circuitry, dedicated logic, programmable logic, microcode, hardware of a device, an integrated circuit, etc.), software (e.g., instructions run or executed on a processing device), or a combination thereof. In some embodiments, the process 800 is performed by the security component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 802, the processing device accesses a variable ("AUTH REQUIRED") that indicates whether authentication is required to unlock the memory sub-system 110. The variable has three possible values: "TRUE," "FALSE," and "PENDING." If the variable is set to "FALSE," no authentication is required and the processing device enters a successful authentication state, at operation 804.

Otherwise, at operation 806, the processing device determines whether the variable is set to "PENDING." If the variable is set to "PENDING," the processing device increments a password retry counter, at operation 808. The password retry counter comprises a count of attempted uses of a password in an authentication session. Upon incrementing the password retry counter, the processing device determines whether the password retry counter has reached a predetermined maximum allowed value ("Max"), at operation 810. If the password retry counter has reached the predetermined maximum allowed value, the processing device clears an authorization session timer, at operation 812. The authorization session timer comprises a program-specific counter that indicates a timeout value (e.g., in seconds) before an active authorization session expires. Upon clearing the timer, the processing device sets the variable to "TRUE" (at operation 814) and discards wrapped data comprising an authorization state indication (at operation 816). The processing device thereafter enters a failed authentication state at operation 818. If the password retry counter has not reached the maximum allowable value at operation 810, the processing device performs operation 830, which is discussed below.

Returning to the determination at operation 806, if the variable is not set to "PENDING," the processing device determines, at operation 820, whether an authentication retry counter has reached a predetermined maximum allowed value ("Max"). The authentication retry counter comprises a count of authentication attempts during the authentication session. If the authentication retry counter has reached the predetermined maximum allowed value, the processing device enters the failed authentication state at operation 818.

Otherwise, the processing device increments the authentication retry counter and sets the variable to "PENDING" at operation 822. At operation 824, the processing device initializes the authentication session timer. At operation 826, the processing device generates a password object and stores a wrapped unlock/authorization state indication in local memory, in the manner discussed above. At operation 828, the processing device clears the password retry counter and outputs the password object to the host system 120.

As shown at operation 830, the processing device checks whether a response has been received from the host system 120. Specifically, the processing device determines whether a password has been received from the host system 120, at operation 832. If no password has been received, the processing device checks whether another command was received from the host system 120, at operation 834. If a command has been received, the processing device clears the authentication session timer, at operation 812, and continues to operation 814 and so forth. If no command has been received, the processing device determines whether the authentication session timer has expired, at operation 836. If the timer has not expired, the processing device performs operation 830. If the timer has expired, the processing device sets the variable to "TRUE" at operation 814.

If a password is received at operation 832, the processing device uses the PBKDF to derive an unwrapping key from the password, at operation 838. At operation 840, the processing device attempts to unwrap the wrapped authorization indication using the unwrapping key. If the unwrapping is unsuccessful, the processing device increments the password retry counter at operation 808 and proceeds as illustrated and described above. An unsuccessful unwrapping indicates that an incorrect password was received at operation 832. If the unwrapping is successful, the processing device outputs the authorization state indication and sets the variable to "FALSE" (at operation 842). The processing device thereafter enters a successful authentication state (at operation 804).

EXAMPLES

Example 1 is a system comprising: a memory component; and a processing device, operatively coupled with the memory component, to perform operations comprising: receiving, from a host system, a request for password generation; in response to receiving the request, generating a password derivation key based on a key derivation seed; deriving a password from the password derivation key; generating a wrapping key based on the password; wrapping an authorization state indication using the wrapping key; storing the wrapped authorization state indication in the memory component; generating, using an asymmetric encryption key, encrypted data based on an encryption of the key derivation seed; and providing a response to the request comprising the encrypted data.

In Example 2, the operations of Example 1 optionally further comprise: receiving an authentication request comprising the password; deriving an unwrapping key from the password; unwrapping the wrapped authorization state indication using the unwrapping key; and providing, in response to the authentication request, the authorization state indication based on the unwrapping.

In Example 3, the operations of Examples 1 or 2 optionally further comprise: generating a password object based on the encrypted data, the password object comprising: an object header and the encrypted data; and providing the password object in response to the request.

In Example 4, the operations of any one of Examples 1-3 optionally comprise constructing an object header; and concatenating the encrypted data and the object header to form the password object.

In Example 5, the operations of any one of Examples 1-4 optionally further comprise generating a scramble key using a random or pseudo-random number generator; and scrambling one or more fields of the password object using the scramble key.

In Example 6, the operations of any one of Examples 1-5 optionally further comprise encoding the password object using a binary-to-text encoding scheme prior to providing the password object in the response.

In Example 7, the operations of any one of Examples 1-6 optionally comprises encrypting binary data and a hash of the binary data, the binary data comprising: one or more non-random data fields, the key derivation seed, and a scramble key.

In Example 8, the operations of any one of Examples 1-7 optionally further comprise: using a key derivation function to generate the password derivation key; using a password derivation function to derive the password; and using a password based key derivation function to generate the wrapping key.

In Example 9, the subject matter of any one of Examples 1-8 optionally comprises a key derivation seed comprising a random or seudo-random number generated by a random or pseudo-random number generator.

In Example 10, the operations of any one of Examples 1-9 optionally further comprise generating the password derivation key based on supplemental data provided by the host system.

Example 11 is a method comprising: receiving, from a host system, a request for password generation; in response to receiving the request, generating, by at least one processor of a memory sub-system controller, a password derivation key based on a key derivation seed; deriving, by at least one processor of the memory sub-system controller, a password from the password derivation key; generating, by at least one processor of the memory sub-system controller, a wrapping key based on the password; wrapping, by at least one processor of the memory sub-system controller, an authorization state indication using the wrapping key; storing the wrapped authorization state indication in a memory of the memory sub-system controller; generating, by at least one processor of the memory sub-system controller, encrypted data based on an encryption of the key derivation seed using an asymmetric encryption key; and providing, by at least one processor of the memory sub-system controller, a response to the request to the host system, the request comprising the encrypted data.

In Example 12, the subject matter of Example 11 optionally comprises: receiving an authentication request comprising the password; deriving an unwrapping key from the password; unwrapping the wrapped authorization state indication using the unwrapping key; and providing, in response to the authentication request, the authorization state indication based on the unwrapping.

In Example 13, the subject matter of any one of Examples 11 or 12 optionally comprises generating a password object based on the encrypted data, the password object comprising: an object header and the encrypted data; and providing the password object in response to the request.

In Example 14, the subject matter of any one of Examples 11-13 optionally comprises: constructing an object header; and concatenating the encrypted data and the object header to form the password object.

In Example 15, the subject matter of any one of Examples 11-14 optionally comprises the generating the password derivation key using a key derivation function; deriving the password using a password derivation; and generating the wrapping key comprises using a password based key derivation function.

In Example 16, the subject matter of any one of Examples 11-15 optionally comprises: encoding the password object using a binary-to-text encoding scheme prior to providing the password object in the response.

In Example 17, the subject matter of any one of Examples 11-16 optionally comprises: encrypting binary data and a hash of the binary data, the binary data comprising: one or more non-random data fields, and the key derivation seed.

In Example 18, the subject matter of any one of Examples 11-17 optionally comprises: generating a hash of binary data using a cryptographic hash function.

In Example 19, the subject matter of any one of Examples 11-18 optionally comprises: the key derivation seed comprising a random or pseudo-random number generated by a random or pseudo-random number generator.

Example 20 is a non-transitory computer-readable storage medium comprising instructions that, when executed by a processing device, configures the processing device to perform operations comprising: receiving, from a host system, a request for password generation; in response to receiving the request, generating a password derivation key based on a key derivation seed; deriving a password from the password derivation key; generating a wrapping key based on the password; wrapping an authorization state indication using the wrapping key; storing the wrapped authorization state indication in a local memory; generating, using an asymmetric encryption key, encrypted data based on an encryption of the key derivation seed; and providing a response to the request comprising the encrypted data.

Machine Architecture

Figure 9:
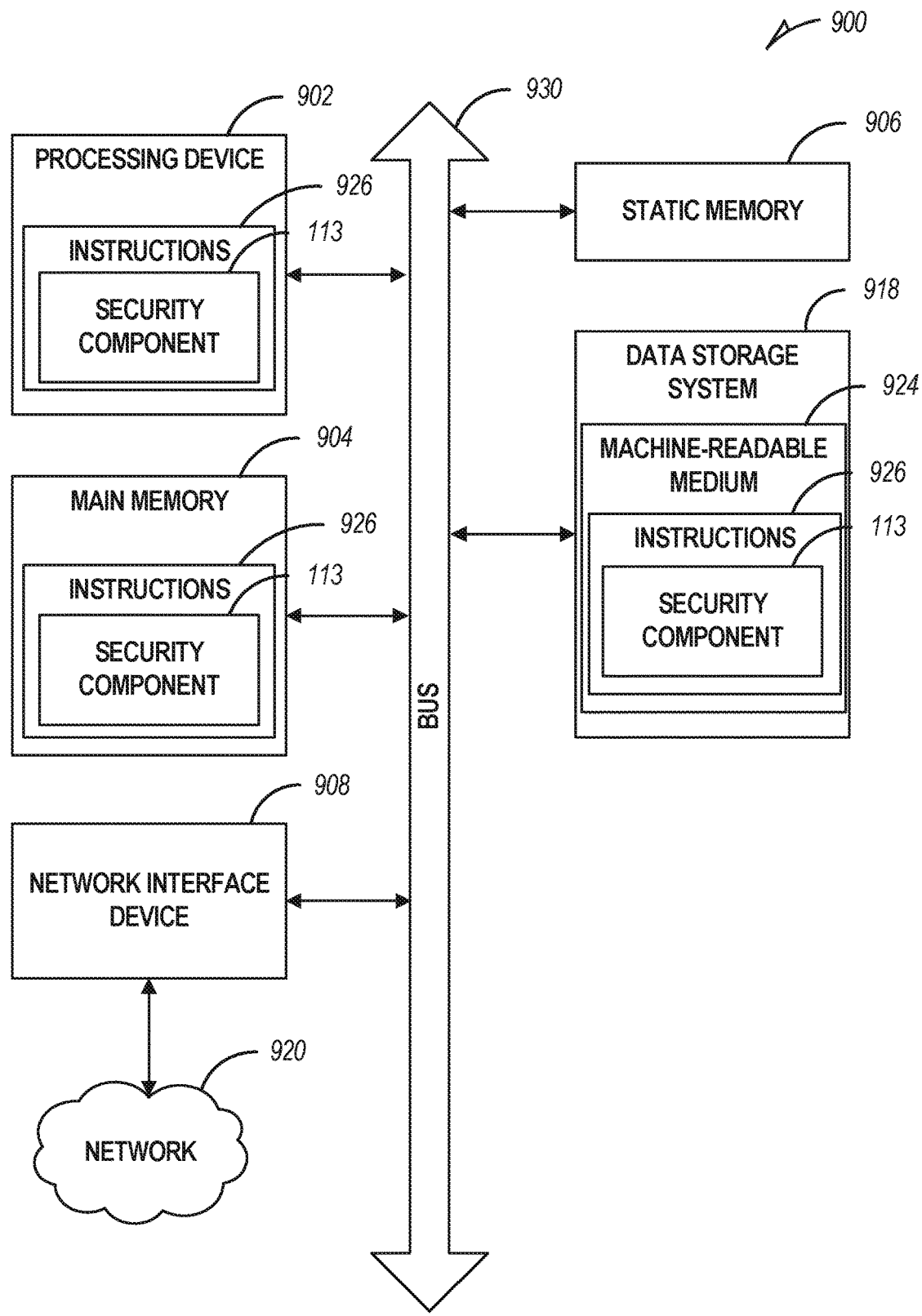
FIG. 9 is a block diagram of an example computer system in which embodiments of the present disclosure may operate.

FIG. 9 illustrates an example machine in the form of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the security component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., ROM, flash memory, DRAM such as SDRAM or Rambus DRAM (RDRAM), etc.), a static memory 906 (e.g., flash memory, static random access memory (SRAM), etc.), and a data storage system 918, which communicate with each other via a bus 930.

The processing device 902 represents one or more general-purpose processing devices such as a microprocessor, a central processing unit, or the like. More particularly, the processing device 902 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 902 can also be one or more special-purpose processing devices such as an ASIC, an FPGA, a digital signal processor (DSP), a network processor, or the like. The processing device 902 is configured to execute instructions 926 for performing the operations and steps discussed herein. The computer system 900 can further include a network interface device 908 to communicate over a network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1.

In one embodiment, the instructions 926 include instructions to implement functionality corresponding to a security component (e.g., the security component 113 of FIG. 1). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; ROMs; RAMs; erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., a computer-readable) storage medium such as a ROM, a RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory component; and
a processing device, operatively coupled with the memory component, to perform operations comprising:
receiving, from a host system, a request for password generation;
in response to receiving the request, generating a password derivation key based on a key derivation seed comprising a random or pseudo-random number generated by a random or pseudo-random number generator;
deriving a password from the password derivation key;
generating a wrapping key based on the password;
wrapping an authorization state indication using the wrapping key;
storing the wrapped authorization state indication in the memory component;
generating, using an asymmetric encryption key, encrypted data based on an encryption of the key derivation seed used to derive the password, the generating of the encrypted data comprises encrypting binary data and a hash of the binary data, the binary data comprising the key derivation seed used to derive the password; and
providing a response to the request comprising the encrypted data.

2. The system of claim 1, wherein the operations further comprise:
receiving an authentication request comprising the password;
deriving an unwrapping key from the password;
unwrapping the wrapped authorization state indication using the unwrapping key; and
providing, in response to the authentication request, the authorization state indication based on the unwrapping.

3. The system of claim 1, Wherein:
the operations further comprise generating a password object based on the encrypted data, the password object comprising: an object header and the encrypted data; and
the response comprises the password object.

4. The system of claim 3, wherein the generating of the password object comprises:
constructing the object header; and
concatenating the encrypted data and the object, header to form the password object.

5. The system of claim 3, wherein the operations further comprise:
generating a scramble key using a random or pseudo-random number generator; and
scrambling one or more fields of the password object using the scramble key.

6. The system of claim 3, wherein the operations further comprise encoding the password object using a binary-to-text encoding scheme prior to providing the password object in the response.

7. The system of claim 1, wherein the binary data further comprises one or more non-random data fields.

8. The system of claim 1, wherein:
the processing device uses a key derivation function to generate the password derivation key;
the processing device uses a password derivation function to derive the password; and
the processing device uses a password based key derivation function to generate the wrapping key.

9. The system of claim 8, wherein:
the operations further comprise receiving supplemental text from a user; and
the generating of the key derivation seed comprises using the key derivation seed and the supplemental text from the user as a seed for the key derivation function.

10. The system of claim 1, wherein the processing device comprises a memory sub-system controller.

11. A method comprising:
receiving, from a host system, a request for password generation;
in response to receiving the request, generating, by at least one processor of a memory sub-system controller, a password derivation key based on a key derivation seed comprising a random or pseudo-random number generated by a random or pseudo-random number generator;
deriving, by at least one processor of the memory sub-system controller, a password from the password derivation key;
generating, by at least one processor of the memory sub-system controller, a wrapping key based on the password;
wrapping, by at least one processor of the memory sub-system controller, an authorization state indication using the wrapping key;
storing the wrapped authorization state indication in a memory of the memory sub-system controller;
generating, by at least one processor of the memory sub-system controller using an asymmetric encryption key, encrypted data based on an encryption of the key derivation seed used to derive the password, the generating of the encrypted data comprises encrypting binary data and a hash of the binary data, the binary data comprising the key derivation seed used to derive the password; and
providing, by at least one processor of the memory sub-system controller, a response to the request to the host system, the request comprising the encrypted data.

12. The method of claim 11, further comprising:
receiving an authentication request comprising the password;
deriving an unwrapping key from the password;
unwrapping the wrapped authorization state indication using the unwrapping key; and
providing, in response to the authentication request, the authorization state indication based on the unwrapping.

13. The method of claim 11, wherein:
the method further comprises generating a password object based on the encrypted data, the password object comprising: an object header and the encrypted data; and
the response comprises the password object.

14. The method of claim 13, wherein the generating of the password object comprises:
constructing the object header; and
concatenating the encrypted data and the object header to form the password object.

15. The method of claim 11, wherein:
the generating of the password derivation key comprises using a key derivation function to generate the password derivation key;
the deriving of the password comprises using a password derivation function to derive the password; and the generating of the wrapping key comprises using a password based key derivation function to generate the wrapping key.

16. The method of claim 13, further comprising encoding the password object using a binary-to-text encoding scheme prior to providing the password object in the response.

17. The method of claim 11, wherein the binary data further comprises one or more non-random data fields.

18. The method of claim 17, further comprising: generating the hash of the binary data using a cryptographic hash function.

19. The method of claim 11, wherein:
the method further comprises receiving supplemental text from a user; and
the generating of the key derivation seed comprises using the key derivation seed and the supplemental text from the user as a seed for a key derivation function.

20. A non-transitory computer-readable storage medium comprising instructions that, when executed by a processing device, configure the processing device to perform operations comprising:

receiving, from a host system, a request for password generation;

in response to receiving the request, generating a password derivation key based on a key derivation seed comprising a random or pseudo-random number generated by a random or pseudo-random number generator;

deriving a password from the password derivation key;

generating a wrapping key based on the password;

wrapping an authorization state indication using the wrapping key;

storing the wrapped authorization state indication in a local memory;

generating, using an asymmetric encryption key, encrypted data based on an encryption of the key derivation seed used to derive the password, the generating of the encrypted data comprises encrypting binary data and a hash of the binary data, the binary data comprising the key derivation seed used to derive the password; and providing a response to the request comprising the encrypted data.

* * * * *